(12) United States Patent
Tominaga et al.

(10) Patent No.: US 6,906,483 B2
(45) Date of Patent: Jun. 14, 2005

(54) ELECTRIC POWER STEERING APPARATUS

(75) Inventors: Tsutomu Tominaga, Tokyo (JP); Tadayuki Fujimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/227,272

(22) Filed: Aug. 26, 2002

(65) Prior Publication Data

US 2003/0173920 A1 Sep. 18, 2003

(30) Foreign Application Priority Data

Mar. 14, 2002 (JP) ........................................ 2002/070240

(51) Int. Cl.⁷ ............................ H02P 1/00; H02P 1/22; H02P 1/40; H02P 3/00; H02P 3/20
(52) U.S. Cl. ...................... 318/293; 318/280; 318/287; 361/688; 361/752
(58) Field of Search ................................ 318/293, 139, 318/254, 256, 280, 287; 361/688, 752, 704, 600, 679, 709, 711, 722, 717–720, 748, 807; 180/280

(56) References Cited

U.S. PATENT DOCUMENTS

| | | | | |
|---|---|---|---|---|
| 4,218,724 A | * | 8/1980 | Kaufman | ................... 361/736 |
| 5,602,451 A | * | 2/1997 | Kohge et al. | ................ 318/293 |
| 5,810,111 A | * | 9/1998 | Takeuchi et al. | ............ 180/443 |
| 6,201,700 B1 | * | 3/2001 | Tzinares et al. | ............ 361/719 |
| 6,548,972 B2 | * | 4/2003 | Takagi | ........................ 318/293 |

FOREIGN PATENT DOCUMENTS

| | | | | |
|---|---|---|---|---|
| JP | 06270824 A | * | 9/1994 | ............ B62D/5/04 |
| JP | 08-192757 | | 7/1996 | |
| JP | 09-030434 | | 2/1997 | |
| JP | 09-117093 | | 5/1997 | |
| JP | 10-243687 A | | 9/1998 | |
| JP | 11-115775 A | | 4/1999 | |
| JP | 2001-196770 A | | 7/2001 | |

* cited by examiner

Primary Examiner—David Martin
Assistant Examiner—Eduardo Colon Santana
(74) Attorney, Agent, or Firm—Sughrue Mion, PLLC

(57) ABSTRACT

An electric power steering removes external wiring connecting between an electric motor and a control unit, whereby the influence of radiation noise caused by a PWM operation can be reduced. In addition, the heat radiation and assemblability of the electric motor and the control unit can be improved, while achieving high power output. A housing 64 with a metal substrate 61 fixedly secured thereto is arranged at a side opposite to an electric motor 30. The cooling fins are formed on an outer side of a housing 64 and on an outer side and an inner side of a cover 65. A metal substrate 61, a large current substrate 62 and a control substrate 63 are arranged inside of the housing 64 and the cover 65 in a laminated structure.

18 Claims, 13 Drawing Sheets

ELECTRIC POWER STEERING APPARATUS

This application is based on Application No.2002-070240, filed in Japan on Mar. 14, 2002, the contents of which are hereby incorporated by reference.

BACKGROUND OF THE INVENTION

1. Field of the Invention

2. Description of the Related Art

In general, in vehicles such as motor cars equipped with an electric power steering apparatus, the steering torque applied to a steering shaft by an operator's steering effort on a steering wheel is detected by a torque sensor so that a control unit can control the current supplied to an electric motor operatively connected with the steering shaft in accordance with the steering torque thus detected, thus causing the electric motor to output a required amount of steering assist torque to the steering shaft through a speed reducer.

FIG. 12 is a block diagram of an electric power steering apparatus which uses a brushless motor as an electric motor.

This electric power steering apparatus includes an electric motor 1 which outputs assist torque to the steering wheel (not shown) of a vehicle, a control unit 6 which controls the operation of the electric motor 1, a battery 4 which supplies current to drive the electric motor 1, a torque sensor 5 which detects the steering torque of the steering wheel, a motor connector 15 which electrically connects the control unit 6 to the electric motor 1, a power connector 16 which electrically connects the battery 4 with the control unit 6, and a signal connector 17 which provides electrical connection between the electric motor 1, the torque sensor 5 and the control unit 6.

The electric motor 1 has an armature winding 2 which is connected in three phases to a stator (not shown) and a rotational position sensor 3 for detecting the rotational position of a rotor (not shown).

The control unit 6 includes three capacitors 7 of large capacities (e.g., about 2200 µF×3) for absorbing ripple components of a motor current IM flowing through the electric motor 1, a pair of shunt resistors 8 for detecting the motor current IM, a three-phase bridge circuit 10 which is composed of a plurality of semiconductor switching elements (for instance, FETs) Q1–Q6 for switching the motor current IM according to the magnitude and direction of the assist torque, a coil 11 for removing electromagnetic noise, and a control circuit 12.

The control circuit 12 includes a current detector 9 connected across the serially connected shunt resistors 8 for detecting a current flowing through the electric motor 1, and a microcomputer 13 for calculating the assist torque generated by the electric motor 1 based on a steering torque signal from the torque sensor 5, the microcomputer 13 also calculating the current corresponding to the assist torque by feeding back the motor current IM and the rotational position of the rotor detected by the rotational position sensor 3. The microcomputer 13 outputs a drive signal to the bridge circuit 10 through a drive circuit 14 so as to control the bridge circuit 10.

In addition, though not shown, the microcomputer 13 includes, in addition to an AD converter, a PWM timer circuit and the like, a well-known self-diagnosis function of self diagnosing at all times whether the system is working normally and of interrupting the motor current IM when there takes place abnormality.

FIG. 13 is a cross sectional plan view of the essential portions of the electric power steering apparatus with the circuit structure shown in FIG. 12. Here, note that in order to avoid the complexity of the drawing, only major circuit elements are illustrated while omitting peripheral circuit elements, wiring patterns, conductive wires, etc.

In this figure, an insulated printed-circuit board 19 is mounted on the bottom of a box-shaped metal frame 18 which has the functions of a shield board and a heat sink concurrently. For instance, a heat sink 20 made of aluminum is attached to one end face of the inner surface of the metal frame 18.

The capacitors 7, the shunt resistors 8, the coil 11, the microcomputer 13, etc., are mounted on the insulated printed-circuit board 19. Also, on the insulated printed-circuit board 19, there are arranged a plurality of conductive plates 21a–21e each having a large width and a large thickness besides the above-mentioned wiring patterns. In addition, the semiconductor switching elements Q1–Q6 are fixedly attached to one end face of the heat sink 20.

Now, the operation of the electric power steering apparatus as constructed above will be described below.

The microcomputer 13 receives an output signal from the torque sensor 5 representative of the steering torque, an output signal from the rotational position sensor 3 representative of the rotational position of the rotor of the electric motor 1, and the motor current IM fed back thereto from the shunt resistors 8 through the current detector 9, and generates a rotational direction instruction for power steering and a current control quantity corresponding to the assist torque, which are input to the drive circuit 14. When the rotational direction instruction and the current control quantity are input from the microcomputer 13, the drive circuit 14 generates a PWM drive signal and supplies it to the semiconductor switching elements Q1–Q6 of the bridge circuit 10. As a result, a current flows from the battery 4 to the electric motor 1 through external wiring, the power connector 16, the coil 11, the bridge circuit 10, the motor connector 15 and another external wiring, so that the electric motor 1 generates a required quantity of assist torque in a required direction.

At this time, the motor current IM flowing through the electric motor 1 is detected by means of the shunt resistors 8 and the current detector 9, and fed back to the microcomputer 13 so that it is controlled to be equal to a motor current instruction Im. In addition, the motor current IM contains ripple components which would be generated by the switching operation of the bridge circuit 10 when the bridge circuit 10 is driven to operate in a PWM manner, but it is controlled to be smoothed by means of the large-capacity capacitors 7. Moreover, the coil 11 serves to prevent the noise, which would be generated by the above-mentioned switching of the bridge circuit 10 during the PWM operation thereof, from being radiated outside to cause radio noise.

In the electric power steering apparatus as described above, the value of the motor current IM to be controlled is about 25–30 A in case of light cars but it reaches such a value as high as about 60–80 A in compact cars.

The control unit 6 of this electric power steering apparatus is installed in the passenger's compartment of an excellent environment in the vehicle, which is remote from the engine room thereof where the electric motor 1 and the battery 4 are arranged.

Accordingly, a plurality of long wires or cables are required for providing electrical connection between the control unit 6 and the electric motor 1. As a result, there arises a problem that the cost of manufacture becomes high and the weight of the vehicle increases.

In addition, if the length of wiring is extended, there takes place another problem in that a power loss is increased and radiation noise generated due to the PWM operation of the bridge circuit 10 is increased as well. Also, the increased radiation noise might cause a malfunction of other control equipment, radio noise, etc.

Furthermore, the size of the semiconductor switching elements Q1–Q6 constituting the bridge circuit 10 in the control unit 6 increases in accordance with the increasing magnitude of the motor current IM. It is also necessary to control the generation of heat at the time of the plurality of semiconductor switching elements Q1–Q6 being turned on or subjected to the PWM switching operation by arranging them in parallel with each other. Thus, the size of the heat sink 20 has to be increased to improve the radiation of heat from the semiconductor switching elements Q1–Q6. Moreover, the sizes of the respective electronic members employed in various parts of the apparatus increase in proportion to the increasing motor current IM, and hence it is required to physically or practically increase the length of a wiring pattern extending from terminals of the power connector 16 to ground by way of the coil 11, the bridge circuit 10 and the shunt resistors 8 as well as the length of a wiring pattern extending from the bridge circuit 10 to the motor connector 15.

As a result of the various reasons as referred to above, there arise the following additional problems. That is, the size of the control unit 6 is necessarily enlarged; the magnitude of the motor current IM is decreased by voltage drops in the respective wiring patterns; and the durability of the wiring patterns is reduced by the heat generated.

SUMMARY OF THE INVENTION

The present invention is intended to solve the above-mentioned variety of problems, and has for its object to provide an electric power steering apparatus which is capable of reducing the influence of radiation noise caused by PWM driving, decreasing the cost and weight thereof and generating large output power.

In order to achieve the above object, the present invention resides in an electric power steering apparatus equipped with an electric motor adapted to output assist torque to a steering wheel of a vehicle, and a control unit for controlling the driving of the electric motor. The control unit includes: a power substrate mounting thereon a bridge circuit which includes a plurality of semiconductor switching elements for switching current supplied to the electric motor in accordance with a torque assisting the steering wheel; capacitors for absorbing ripples contained in the current; a control substrate mounting thereon a microcomputer which generates a drive signal for controlling the bridge circuit based on at least steering torque of the steering wheel; a power connector electrically connected to a battery of the vehicle; a signal connector adapted to input and output signals through external wiring; a plurality of motor terminals electrically connected with the electric motor; a large current substrate mounting thereon at least the capacitors and having conductive plates forming wiring patterns and the motor terminals insert molded thereto with an insulating resin; and a housing and a cover in which the power substrate, the control substrate and large current substrate are received. The power substrate, the power connector and the signal connector are arranged in the housing in parallel with each other in an axial direction of the electric motor, with the motor terminals being protruded outward from the cover.

According to the above arrangement, it is possible to reduce the height or the size in the vertical direction of the apparatus, without causing no interference between the power substrate, the power connector and the signal connector. In addition, the housing is arranged on the opposite side of the heat-generating electric motor so that the heat inside the control unit can be effectively radiated. As a result, the durability and heat resistance of the apparatus are improved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Figure 12:
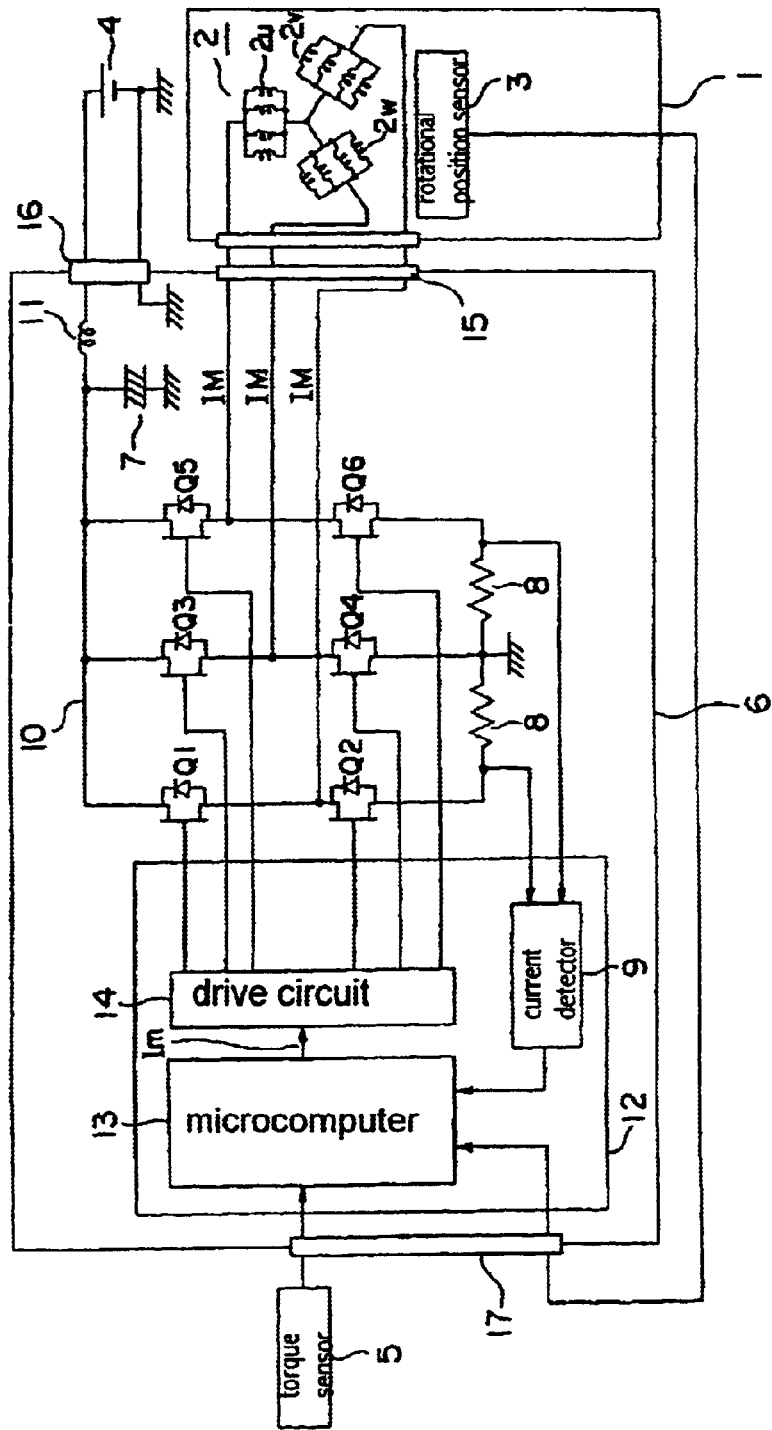
FIG. 12 is a block diagram showing a known electric power steering apparatus.
Figure 13:
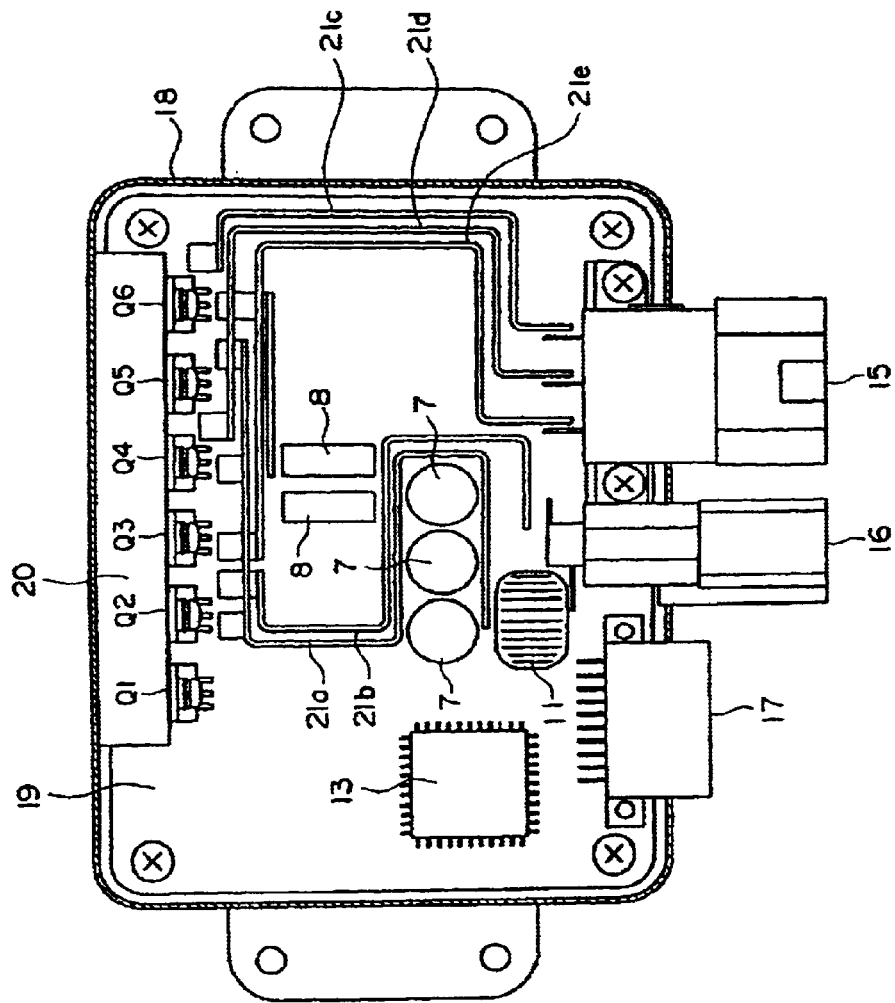
FIG. 13 is a cross sectional plan view of the essential portions of the known electric power steering apparatus with a circuit structure shown in FIG. 12.

In the respective figures to be referred to below, the same symbols are attached to the same or corresponding parts or elements as those of the known apparatus shown in FIG. 12 and FIG. 13.

Embodiment 1.

Figure 1:
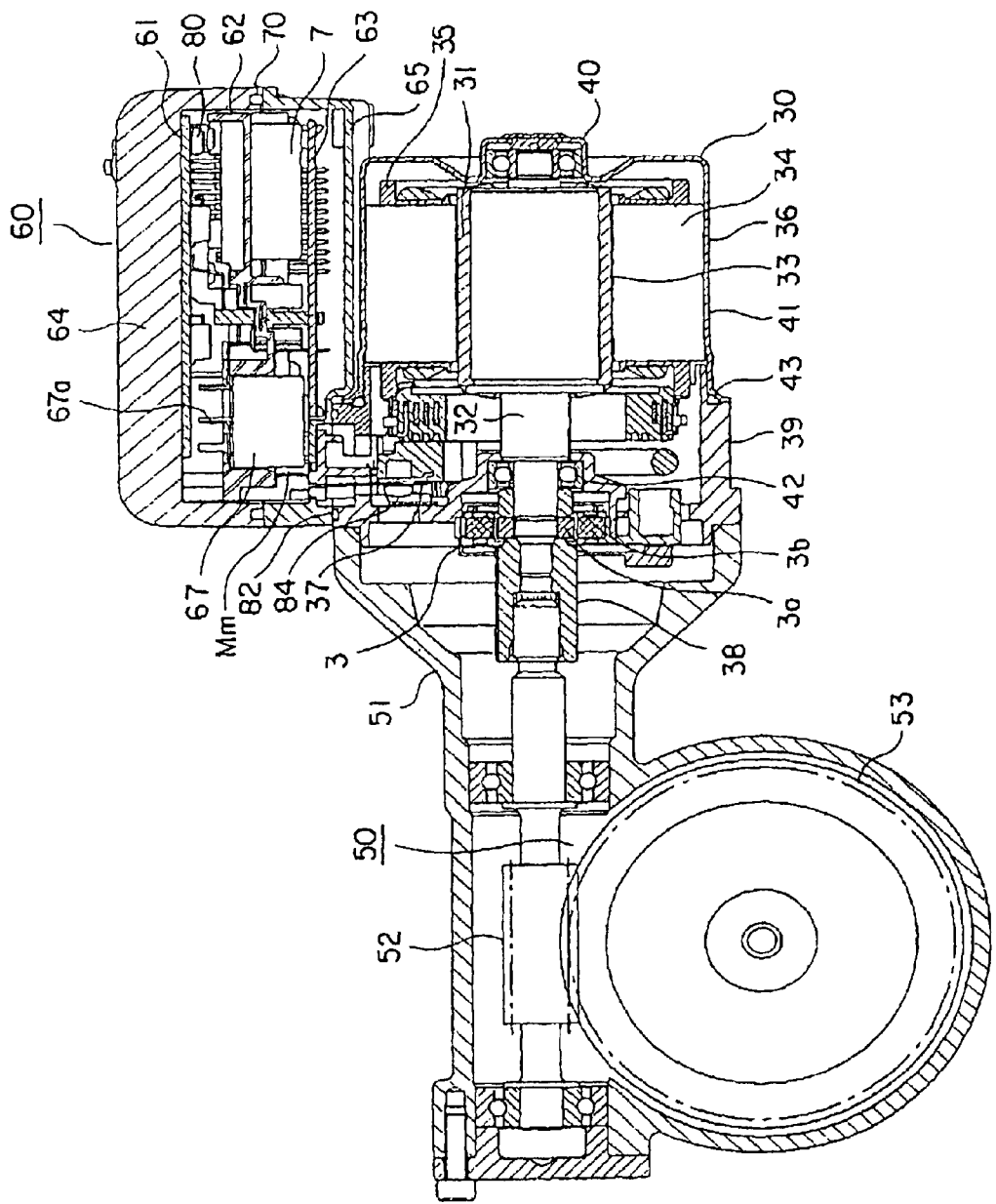
FIG. 1 is a cross sectional view showing an electric power steering apparatus according to a first embodiment of the present invention.
Figure 2:
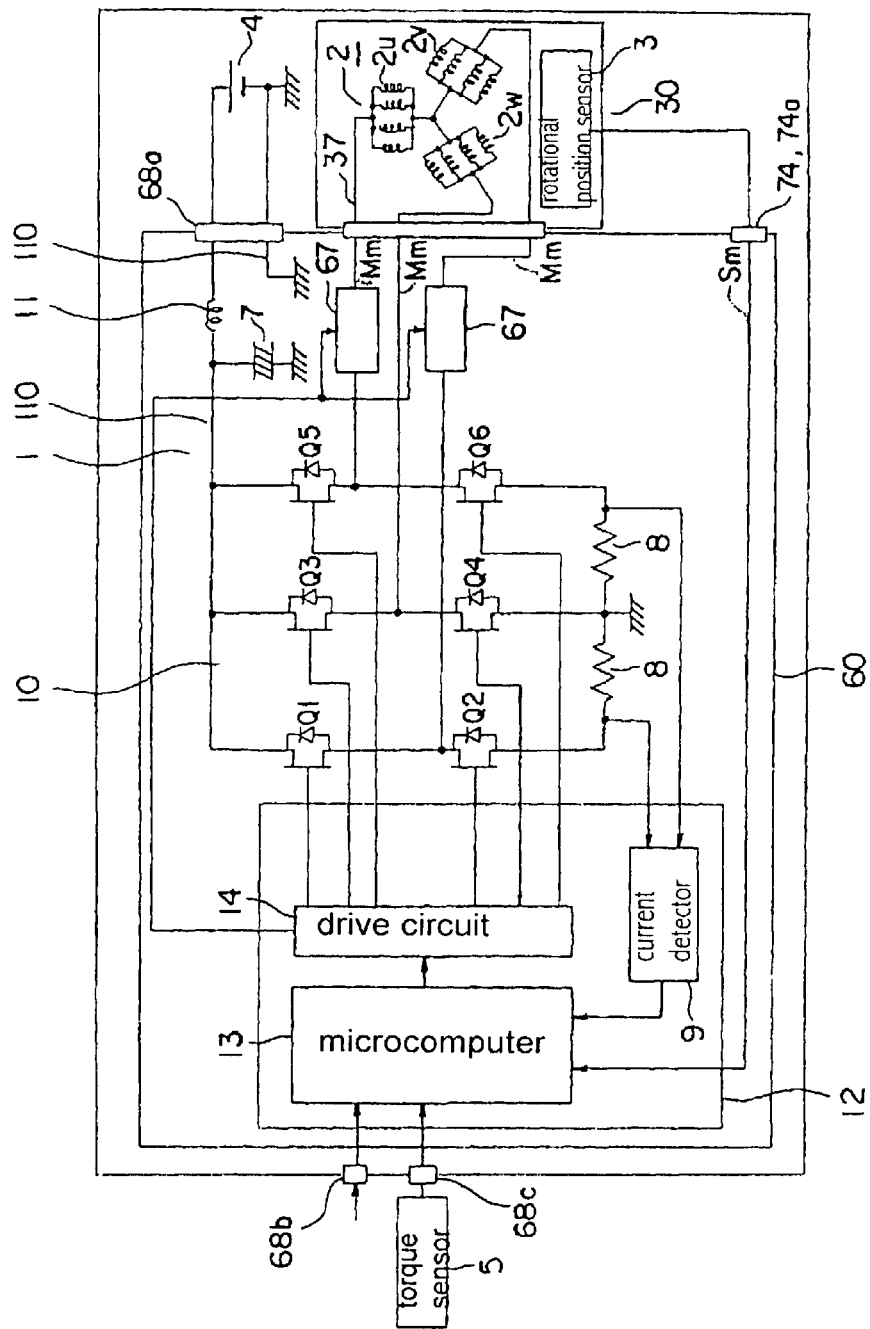
FIG. 2 is a block diagram of the electric power steering apparatus of FIG. 1.
Figure 3:
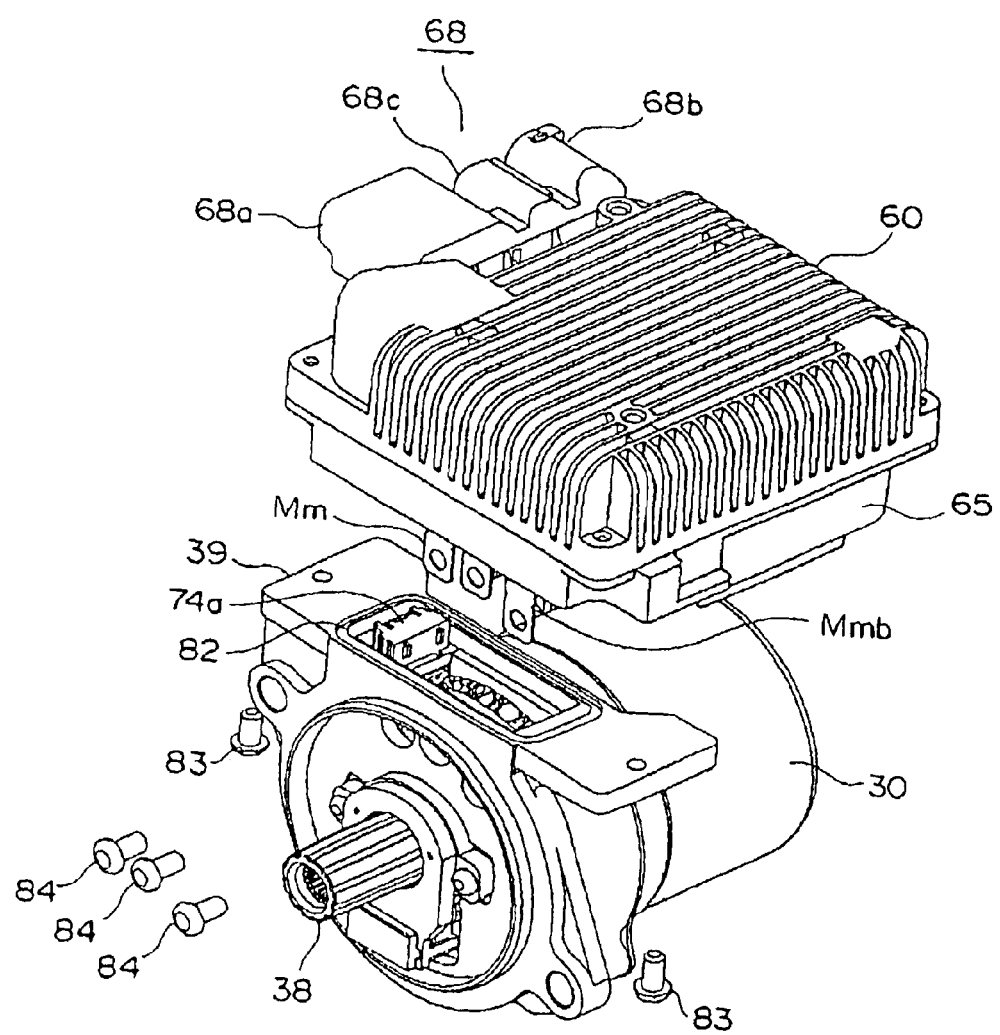
FIG. 3 is an exploded perspective view of the electric power steering apparatus of FIG. 1.
Figure 4:
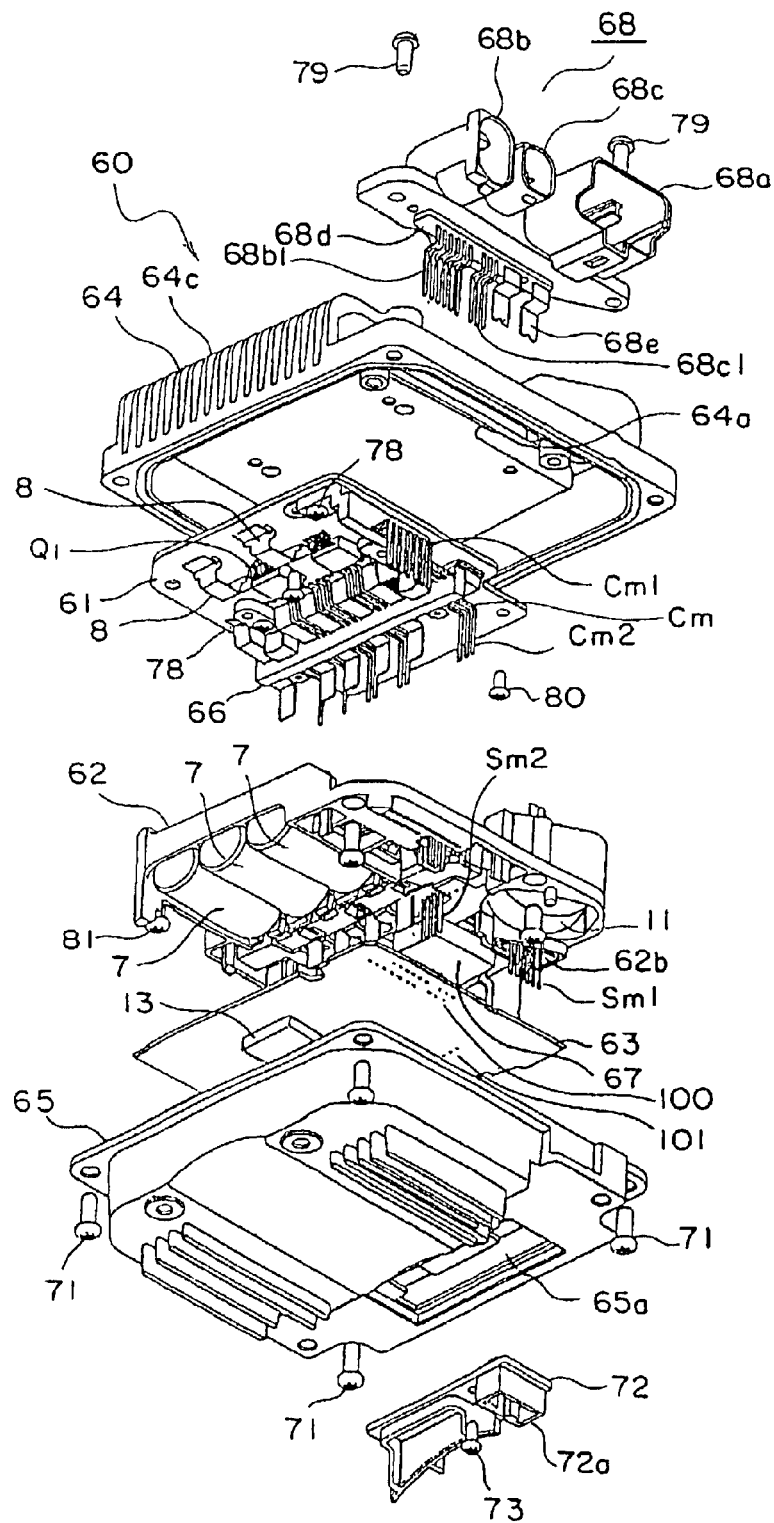
FIG. 4 is an exploded perspective view of a control unit shown in FIG. 1.
Figure 5:
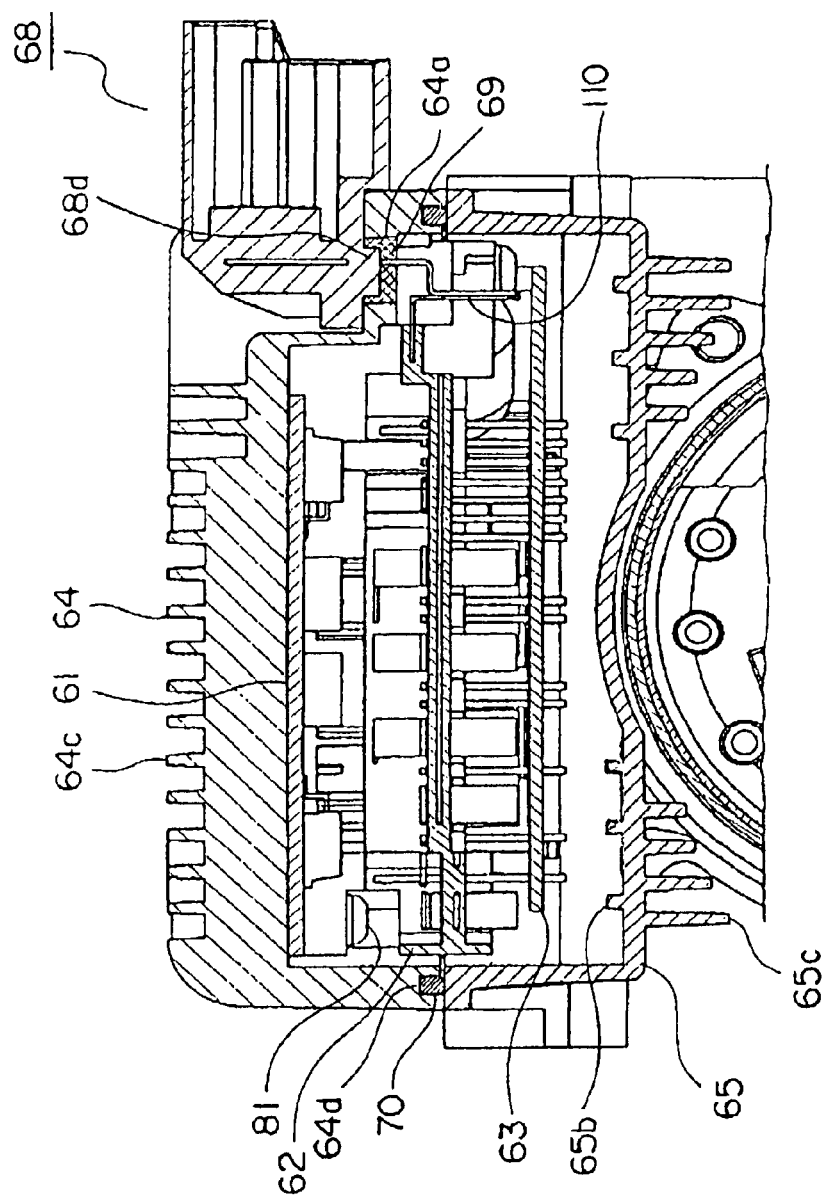
FIG. 5 is a cross sectional view of the control unit of FIG. 1.
Figure 6:
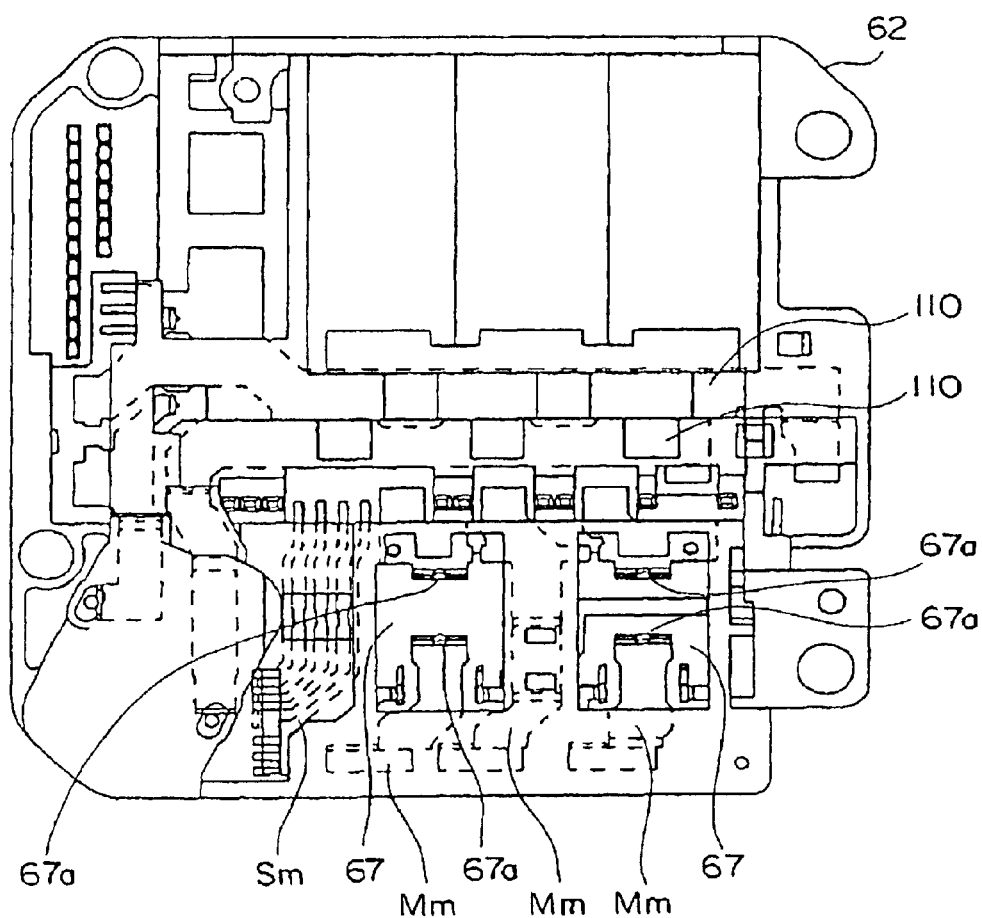
FIG. 6 is a plan view of a large current substrate of FIG. 4 when seen from one side thereof.
Figure 7:
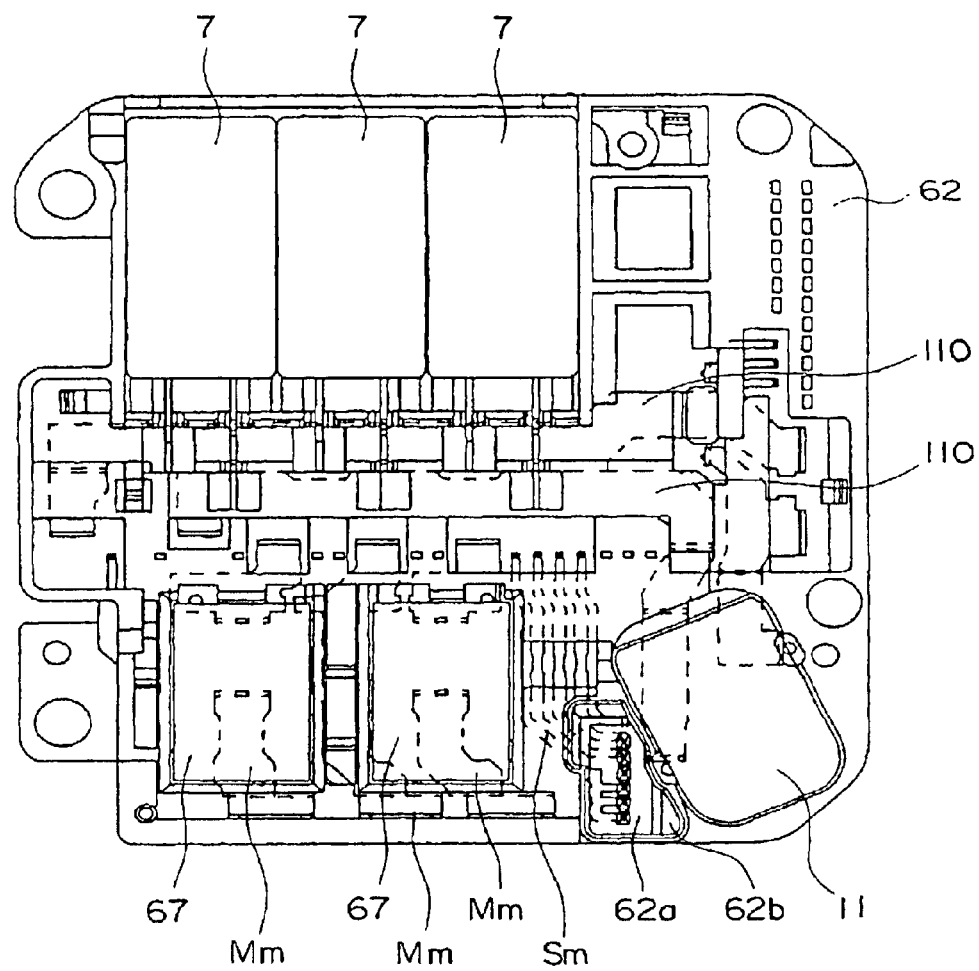
FIG. 7 is a rear view of the large current substrate of FIG. 6.
Figure 8:
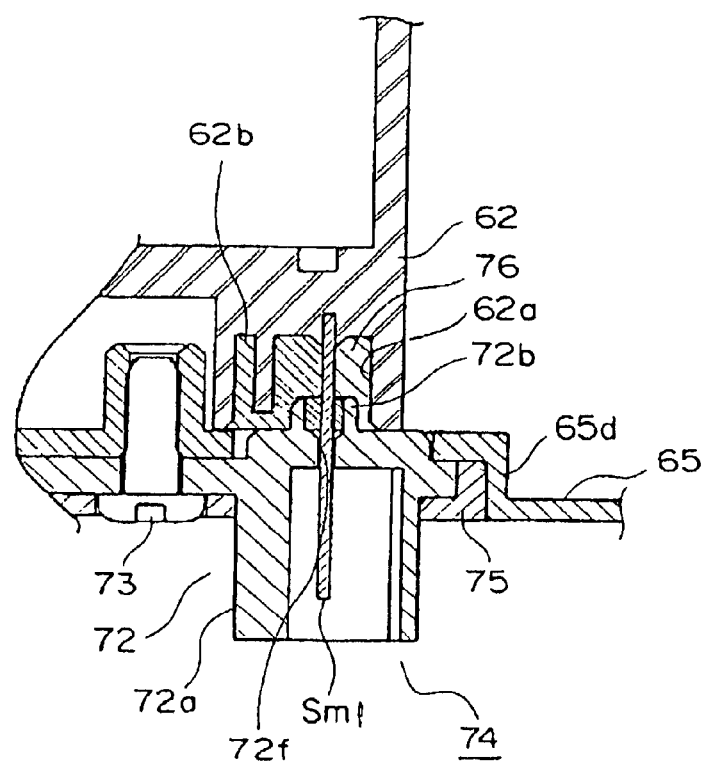
FIG. 8 is a cross sectional view of a part of the control unit of FIG. 1.
Figure 9:
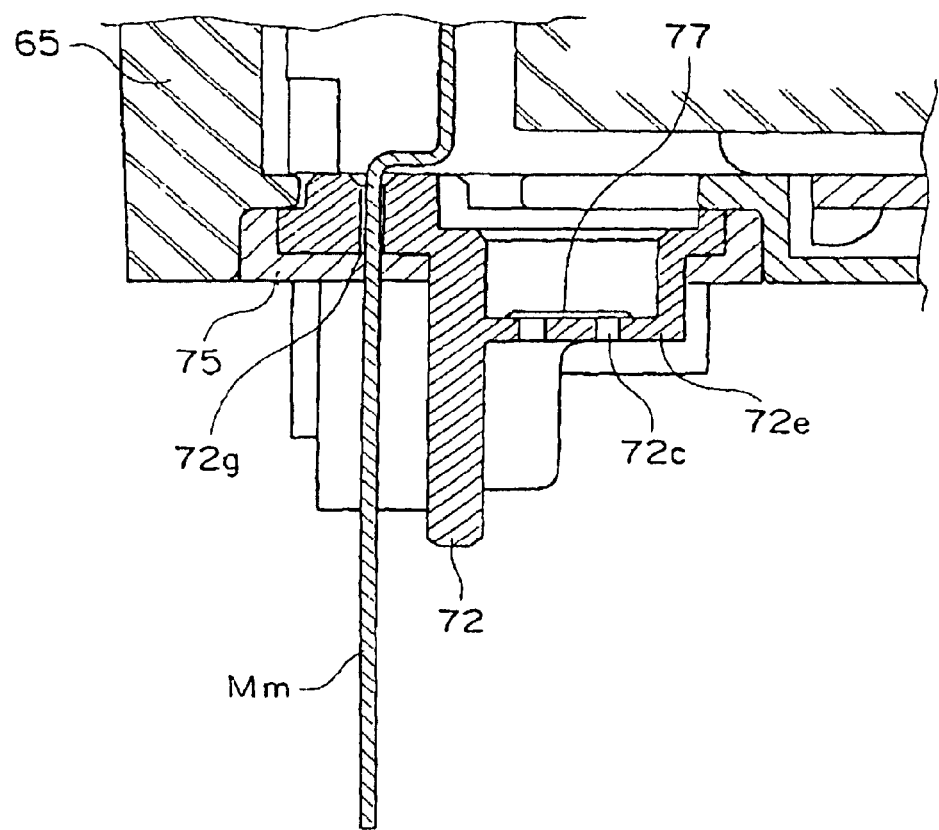
FIG. 9 is a cross sectional view of a part of the control unit of FIG. 1.

FIG. 1 is a cross sectional view which shows an electric power steering apparatus according to a first embodiment of the present invention. FIG. 2 is a block diagram of the electric power steering apparatus of FIG. 1. FIG. 3 is an exploded perspective view of the electric power steering apparatus of FIG. 1. FIG. 4 is an exploded perspective view of a control unit 60 of FIG. 1. FIG. 5 is a cross sectional view of the control unit 60 of FIG. 1. FIG. 6 is a plan view of a large current substrate 62 of FIG. 4 when seen from one side thereof. FIG. 7 is a rear view of FIG. 6. FIG. 8 and FIG. 9 are cross sectional views of a part of the control unit 60 of FIG. 1.

The electric power steering apparatus illustrated includes an electric motor 30 which outputs assist torque to the steering wheel (not shown) of a vehicle, a control unit 60 which controls the operation of the electric motor 30, a battery 4 which supplies current to the electric motor 30 for driving thereof, a torque sensor 5 which detects the steering torque of the steering wheel, and connectors 68, 74 and 74a for receiving and outputting signals.

The electric motor 30 in the form of a three-phase brushless motor includes an output shaft 32, a rotor 33 with a permanent magnet 31 having 8 magnetic poles fixedly attached to the output shaft 32, a stator 36 arranged around the rotor 33, and a rotational position sensor 3 arranged at an output side of the output shaft 32 for detecting the rotational position of the rotor 33.

The stator 36 includes twelve salient poles 34 arranged in confrontation with the outer periphery of the permanent magnet 31, insulators 35 attached to the opposite sides of the salient poles 34, respectively, an armature winding 2 which is wound around the insulators 35 and which consists of winding components ($2u$, $2v$, $2w$) of three phases U, V and W. The armature winding 2 has three ends of three phases connected to three winding terminals 37, respectively, which extend in the axial direction of the output shaft 32.

The rotational position sensor 3 is comprised of a resolver, and has a rotor $3a$ and a stator $3b$. The outside shape or profile of the rotor $3a$ is formed into a special curve such that the permeance of a diametral or radial gap defined between the stator $3b$ and the rotor $3a$ changes like a sine wave in accordance with the angle of rotation of the rotor $3a$ with respect to the stator $3b$. An exciting coil and two output coils are wound around the stator $3b$ so as to detect a change in the diametral gap (i.e., a change in the radial distance) between the rotor $3a$ and the stator $3b$ to generate output voltages of two phases which change in a sine curve and in a cosine curve, respectively.

A speed reduction gear 50 is fixedly mounted on the electric motor 30. The speed reduction gear 50 includes a gear case 51 connected with a bracket 39 of the electric motor 30, a worm gear 52 arranged in the gear case 51 for reducing the rotational speed of the output shaft 32, and a worm wheel 53 which is in meshing engagement with the worm gear 52. The worm gear 52 is formed at its one end with an outer spline, and a coupling 38 having an inner spline formed on its inner surface is press fitted over an end of the output shaft 32, so that the splined end of the worm gear 52 is fitted into the coupling 38 to provide spline engagement, through which the torque of the electric motor 30 is transmitted to the speed reduction gear 50.

The control unit 60 includes three capacitors 7 of large capacities (e.g., about 2200 $\mu$F×3) for absorbing ripple components of a motor current IM flowing through the electric motor 30, a pair of shunt resistors 8 for detecting the motor current IM, a three-phase bridge circuit 10 which is composed of a plurality of semiconductor switching elements (for instance, FETs) Q1–Q6 for switching the motor current IM according to the magnitude and direction of the assist torque, a coil 11 for removing electromagnetic noise, and a control circuit 12.

The control circuit 12 includes a current detector 9 connected across the serially connected shunt resistors 8 for detecting a motor current IM flowing through the electric motor 30 and a microcomputer 13 for calculating the assist torque generated by the electric motor 30 based on a steering torque signal from the torque sensor 5, the microcomputer 13 also calculating the current corresponding to the assist torque by feeding back the motor current IM and the rotational position of the rotor detected by the rotational position sensor 3. The microcomputer 13 outputs a drive signal to the bridge circuit 10 through the drive circuit 14 so as to control the bridge circuit 10.

The control unit 60 includes a metal substrate 61 acting as a power substrate, a large current substrate 62 having a plurality of conductive wires and conductive plates insert molded with an insulating resin, a control substrate 63 in the form of an insulated printed-circuit board, a housing 64 made of aluminum having high thermal conductivity, and a cover 65 which is connected to the housing 64 and houses therein the metal substrate 61, the large current substrate 62, the control substrate 63, etc.

The housing 64 and the cover 65 are arranged in parallel to the axial direction of the electric motor 30 with the cover 65 being fixed to the bracket 39 of the electric motor 30.

The metal substrate 61 is comprised of an HITT substrate (a brand name of Denki Kagaku Kogyo K. K.) for example. That is, wiring patterns are formed on an aluminum substrate of a thickness of 2 mm as a copper pattern of a thickness of 100 $\mu$m through an insulating layer of a thickness of 80 $\mu$m. In addition, mounted on the wiring patterns on the metal substrate 61 through soldering, are switching elements Q1–Q6 which together constitute the bridge circuit 10 for switching the current supplied to the electric motor 30, large current parts such as the shunt resistors 8, etc., for detecting the current which flows through the electric motor 30, and a connection member 66 which provides electrical connection between the metal substrate 61 and the large current substrate 62.

The connection member 66 has a plurality of connection terminals Cm, which are formed by insert molding, for providing electrical connection between the metal substrate 61 and the large current substrate 62, and between the metal substrate 61 and the control substrate 63. Each of the connection terminals Cm of the connection member 66 has its end portions Cm1, Cm2 arranged in the form of a letter L, when viewed in a direction perpendicular to the metal substrate 61, as show in FIG. 4.

The wiring patterns formed on the metal substrate 61 each have a cross sectional capacity enough to accommodate or withstand a large current flowing therethrough, so that circuit elements used for a large current flowing through the electric motor 30 can be mounted.

Peripheral or surrounding circuit elements (small current parts) including the microcomputer 13, the drive circuit 14 and the current detector 9 are mounted through soldering on the wiring patterns on the control substrate 63.

The wiring patterns on the large current substrate 62 are formed by a plurality of conductive wires and conductive plates through insert molding of an insulating resin. The plurality of conductive wires and conductive plates are exposed from the insulating resin at locations for electrical connection.

Each of sensor terminals Sm for sending a signal from the rotational position sensor 3 to the microcomputer 13 has one end portion Sm2 exposed from the insulating resin to be electrically connected with the control substrate 63, and the other end portion Sm1 protruded from a hole $65a$ in the form of an opening formed in the cover 65 to be electrically connected with the rotational position sensor 3 of the electric motor 30.

A plurality of conductive plates 110 for electrically connecting between the bridge circuit 10 and a power connector

68*a* to be described later in detail are arranged in parallel with each other in the vicinity of the center of the large current substrate 62, as shown in FIG. 6 and FIG. 7. The conductive plates 110 are electrically connected through welding with the three capacitors 7 which are arranged at a side opposite to motor terminals Mm.

The motor terminals Mm protrude from the hole 65*a* in the form of an opening formed in the cover 65 so as to be inserted into the electric motor 30 whereby they are electrically connected with the winding terminals 37, respectively. The motor terminals Mm include three paths arranged in parallel with each other. Motor relays 67 in the form of switches for making or interrupting the supply of motor current IM from the bridge circuit 10 to the electric motor 30 are connected in series with two outer ones of the three paths, respectively. These switches are connected with the paths through welding, as shown in FIG. 1. Their welding locations are arranged at a side diametrally or radially opposite to the electric motor 30 side at which the switches are connected with the motor terminals Mm.

The housing side connector 68 fixedly attached to the housing 64 includes a power connector 68*a* electrically connected to the battery of the vehicle, a signal connector 68*b* for receiving and outputting signals from and to the vehicle side through external wiring, and a torque sensor connector 68*c* for receiving a signal from the torque sensor 5. The power connector 68*a*, the signal connector 68*b* and the torque sensor connector 68*c* are formed of an insulating resin and molded into an integral unit. Note that the torque sensor connector 68*c* may not be necessarily formed integral with the signal connector 68*b*, that is, they may be formed separately from each other.

The housing side connector 68 is inserted into the hole 64*a* in the housing 64 from the outside, and fixedly attached to the housing 64. The housing side connector 68 is formed with a protrusion 68*d*. As shown in FIG. 5, a gap or clearance is formed between the inner wall surface of the hole 64*a* in the housing 64 and the side surface of the protrusion 68*d*. An adhesive resin in the form of a silicon adhesive 69 is filled into the gap so that the insulating resin portions of the housing 64 and the housing side connector 68 are coupled with each other through adhesion. The power connector 68*a* has terminals 68*e* electrically connected with the conductive plates 110 of the large current substrate 62 through welding.

Here, note that in the case where there is no protrusion 68*d*, an adhesive resin is filled into a gap or clearance between the housing side connector and a hole which is formed upon mounting of the housing side connector 68 to the housing 64.

The housing 64 has cooling fins 64*c* formed on the outer side surface thereof. The metal substrate 61 is attached to the inner side of the housing 64 in intimate contact therewith so that the radiation of the heat generated by the metal substrate 61 is increased under the action of the cooling fins 64*c*. The large current substrate 62 is received in and fixedly secured to the housing 64 while covering the metal substrate 61. In addition, the control substrate 63 is arranged to be superposed on the large current substrate 62. As a consequence, the metal substrate 61, the large current substrate 62 and the control substrate 63 together form a laminated structure including three layers. In contrast, the metal substrate 61 and the housing side connector 68 are arranged in the housing 64 in such a manner that they do not superpose one over the other, but they are arranged in parallel to the output shaft 32.

The end portions Cm1, Cm2 of each of the plurality of connection terminals Cm are arranged in the form of a letter L on the metal substrate 61. However, one end portion Cm1, at one side of the L-shaped configuration, of each connection terminal Cm is arranged in the neighborhood of and in parallel with terminals 68*b*1, 68*c*1 of the signal connector 68*b* and the torque sensor connector 68*c*. The one end portion Sm2 of each sensor terminal Sm is arranged in alignment with the other end portion Cm2 at the other side of the L-shaped configuration of each connection terminal Cm. The end portions Cm1, Cm2 of each connection terminal Cm, the one end portion Sm2 of each sensor terminal Sm, the terminals 68*b*1 of the signal connector 68*b* and the terminals 68*c*1 of the torque sensor connector 68*c* are inserted in and soldered to corresponding through holes 100, 101 formed in the control substrate 63.

A rubber ring 70 is inserted into a groove 64*d* formed around the opening of the housing 64, and the cover 65 is fixedly attached to the housing 64 by means of screws 71. As a result, airtightness at the mating surfaces of the housing 64 and the cover 65 is secured. At this time, the mating surfaces are located between the control substrate 63 and the metal substrate 61, as seen from FIG. 5.

As shown in FIG. 5, the cover 65 has inner cooling fins 65*b* and outer cooling fins 65*c* formed in such a manner that these cooling fins 65*b*, 65*c* are arranged so as not to interpose each other, when viewed in a diametrical or radial direction of the electric motor 30. The inner cooling fins 65*b* function to perform heat transfer by natural convection, whereas the outer cooling fins 65*c* function to perform heat transfer in a state including forced convection in addition to natural convection. For this reason, the inner cooling fins 65*b* have a pitch or interval larger than that of the outer cooling fins 65*c* in order to expedite smooth natural convection in the inner cooling fins 65*b*.

Note that in this embodiment, the cooling fins 65*b*, 65*c* are arranged to be shifted or displaced from each other in a direction perpendicular to the axis of the electric motor 30, but they may be formed to be shifted or displaced from each other in the axial direction of the electric motor 30.

A lid 72 made of an insulating resin is mounted to the outer side of the cover 65 by means of screws 73 so as to cover the hole 65*a* of the cover 65. As shown in FIG. 9, the lid 72 has three penetration holes 72*g* formed therein through which the motor terminals Mm electrically connected with the armature winding 2 extend. Each of the motor terminals Mm is formed at its intermediate portion with a low-rigidity portion Mmb of a narrow width.

Moreover, as shown in FIG. 8, the lid 72 has a plurality of penetration holes 72*f* formed therein through which the end portions Sm1 of the sensor terminals Sm electrically connected with the rotational position sensor 3 extends, and the lid 72 also has a connector housing 72*a* formed outside of the penetration holes 72*f*, so that the end portions Sm1 of the sensor terminals Sm are inserted into the penetration holes 72*f*, thus constructing a sensor connector 74.

Moreover, as shown in FIG. 9, when the lid 72 is attached to the cover 65, there are formed a gap or clearance between the outer periphery of the lid 72 and the hole 65*a* and gaps or clearances around the penetration holes 72*g*. However, an adhesive resin in the form of a silicon adhesive 75 is filled into these gaps to secure the airtightness of the mating portions of the lid 72 and the cover 65. Note that when the motor terminals Mm are in intimate contact with the penetration holes 72*g*, the adhesive resin is filled into the surroundings of the those portions of the motor terminals Mm which protrude from the lid 72.

The large current substrate 62 has a first concave portion 62*a* formed in a portion thereof in which the end portions Sm1 of the sensor terminals Sm protrude toward the sensor connector 74, and a second concave portion 62*b* formed outside of the first concave portion 62*a*. The connector housing 72*a* has a convex portion 72*b* in the neighborhood of the penetration holes 72*f* for the end portions Sm1 of the sensor terminals Sm, the convex portion 72*b* being inserted into the first concave portion 62*a* with a gap or clearance formed therebetween. An adhesive resin in the form of a silicon adhesive 76 is filled into the first concave portion 62*a* before the lid 72 is assembled. As the convex portion 72*b* of the connector housing 72*a* is inserted into the first concave portion 62*a*, the silicon adhesive 76 is caused to flow out from the first concave portion 62*a* into the second concave portion 62*b*, so that the silicon adhesive 76 is filled into the gap between the first concave portion 62*a* and the convex portion 72*b*. As a result, the airtightness of the mating portions of the sensor terminals Sm and the lid 72 is secured.

The lid 72 is also formed with a plurality of vent holes 72*c* for providing fluid communication between the interior and the exterior of the control unit 60. A water-repellent filter 77, which permits the passage of air but blocks the passage of water, is heat welded to the inner surface of the lid 72 from the inside thereof so as to cover the vent holes 72*c*. In addition, the vent holes 72*c* are formed in the convex portion 72*e* protruded outward from the surface of the silicon adhesive 75 which adheres or bonds the cover 65 and the lid 72 together, so as to prevent the silicon adhesive 75 from flowing into the vent holes 72*c* to close them.

Figure 10:
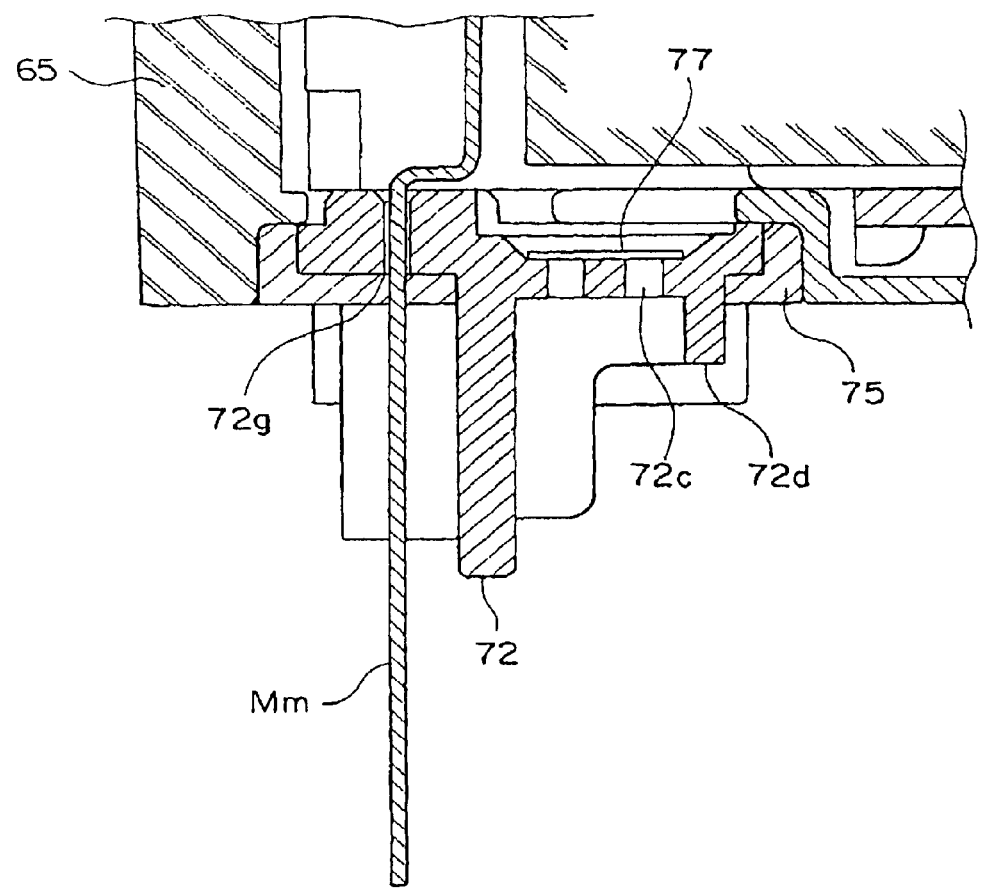
FIG. 10 is a cross sectional view of a part of a modification of the control unit of FIG. 1.

Here, note that a wall 72*d* protruding outward from the surface of the silicon adhesive 75 may be formed in surroundings of the vent holes 72*c*, as shown in FIG. 10.

Now, reference will be made to the assembling procedure of the electric power steering apparatus as constructed above.

First of all, when the electric motor 30 is assembled, the permanent magnet 31 is fixedly adhered to the output shaft 32 of the electric motor 30, and then the output shaft 32 is magnetized to form eight poles by a magnetizer. Thereafter, an inner race of a bearing 40 is press fitted over the output shaft 32, thus forming the rotor 33.

Subsequently, the three-phase armature winding 2 is wound around the twelve salient poles 34 of the stator 36 through the insulators 35 in such a manner that the winding components (2*u*, 2*v*, 2*w*) of three phases U, V and W are shifted in their positions by an electrical angle of 120 degrees apart from one another. In this manner, four windings per each of U, V and W phases and hence twelve windings in total are formed. Then, the winding starting ends and the winding terminating ends of the respective windings of U phase are connected with each other to form the armature winding component 2*u* of U phase. Similarly, the armature winding components 2*v*, 2*w* of V phase and W phase are formed. The winding terminating ends of the armature winding components 2*u*–2*w* of U, V and W phases are mutually connected with each other to form neutral points, and the winding starting ends of the armature winding components 2*u*–2*w* of U, V and W phases are connected with the winding terminals 37, respectively.

Thereafter, the stator 36 thus formed is press fitted into a yoke 41.

Subsequently, the outer race of the bearing 42 is fixedly secured to the bracket 39, and then the output shaft 32 of the rotor 33 is press fitted into the inner race of the bearing 42. The rotor 3*a* of the rotational position sensor 3 and the coupling 38 are press fitted over the output shaft 32. In addition, the stator 3*b* of the rotational position sensor 3 is fixedly secured to the bracket 39. Thereafter, the yoke 41 having the stator 36 built therein is fitted over and fixedly secured by screws (not shown) to the bracket 39 with a rubber ring 43 mounted on an outer peripheral end thereof, Next, reference will be made to the assembling procedure of the control unit 60.

First, parts such as the microcomputer 13, its surrounding or peripheral circuit elements, etc., are arranged on the control substrate 63 with the respective electrodes coated with a cream solder. Then, by heating the control substrate 63 from its one side or by heating the entire atmosphere surrounding the control substrate 63 by the use of a reflow device, the cream solder is melted to solder the respective parts to the corresponding electrodes on the control substrate 63.

Similarly, other parts such as the semiconductor switching elements Q1–Q6, the shunt resistors 8, etc., are arranged on the metal substrate 61 with their electrodes coated with a cream solder, and the connection member 66 is placed on and fixedly attached to the metal substrate 61 by means of screws 78. Then, the cream solder is melted by the use of the reflow device to solder the respective parts and the connection member 66 to the corresponding electrodes on the metal substrate 61.

On the large current substrate 62, there are arranged the coil 11, the capacitors 7, the motor relays 67, etc., at prescribed positions. These electronic parts are coupled with the conductive plates 110 and the motor terminals Mm by means of welding. At this time, a group of the conductive plates 110 are arranged in the vicinity of the center of the large current substrate 62 in parallel with each other. In this manner, a group of the motor terminals Mm are constructed such that their three paths are arranged adjacent and in parallel with each other.

In addition, the capacitors 7 are mounted on the large current substrate 62 at a side opposite to the motor terminals Mm connected to the motor relays 67, which are also connected in series with two outer ones of the three paths, respectively.

Thereafter, the housing side connector 68 is fitted into the hole 64*a* in the housing 64 from the outside thereof and fixedly secured to the housing 64 by means of screws 79. At this time, the silicon adhesive 69 is filled in the gap between inner wall surface of the hole 64*a* in the housing 64 and the protrusion 68*d* of the housing side connector 68, and hence the insulating resin portions of the housing 64 and the housing side connector 68 are adhered or bonded to each other through the silicon adhesive 69.

Subsequently, the metal substrate 61 is placed on the housing 64 from the opening side thereof and fixedly attached thereto by screws 80. Then, the large current substrate 62 is arranged on and fixedly secured through screws 81 to the metal substrate 61. At this time, the metal substrate 61 is fixed to the housing 64 by means of the screws 80, 81 which are arranged at four corners of the housing 64. As a result, the metal substrate 61 is urged into intimate contact with the housing 64. Thereafter, the terminals 68*e* of the power connector 68*a* are electrically connected with the conductive plates 110 on the large current substrate 62 by means of welding. In addition, the conductive plates 110 and the motor terminals Mm on the large current substrate 62 are electrically connected with the connection terminals Cm, respectively, of the connection member 66 on the metal substrate 61 by means of welding.

Thereafter, the control substrate 63 is arranged at an upper portion of the large current substrate 62, and the connection terminals Cm, the terminals 68*b*1 of the signal connector 68*b*, the terminals 68*c*1 of the torque sensor connector 68*c*, the sensor terminals Sm of the large current substrate 62, etc., are inserted into the through holes 100, 101 in the control substrate 63 and connected with each other collectively by means of soldering with partial jet streams.

At this time, the terminals inserted into the through holes 100, 101 of the control substrate 63 are each arranged in the form of a letter L. One end portion Cm1, at one side of the L-shaped configuration, of each of the plurality of connection terminals Cm is arranged in the neighborhood of and in parallel to the terminals 68b1 of the signal connector 68b and the terminals 68c1 of the torque sensor connector 68c. Further, the end portions of the terminals inserted into the through holes 100, 101 of the control substrate 63 are concentrated on two sides of the control substrate 63, and the mating surfaces of the housing 64 and the cover 65 are located between the control substrate 63 and the metal substrate 61 in a diametral or radial direction of the output shaft 32.

Subsequently, the rubber ring 70 is inserted into the groove 64d formed on the outer periphery of the opening in the housing 64, and the cover 65 is fixedly secured to the housing 64 by means of the screws 71 with the silicon adhesive 76 being filled into the first concave portion 62a of the large current substrate 62. At this time, airtightness at the mating surfaces of the housing 64 and the cover 65 is secured. Then, the water-repellent filter 77 is heat welded to the inner surface of the lid 72 so as to cover the vent holes 72c formed therethrough, and one end portions Sm1 of the sensor terminals Sm are inserted into the penetration holes 72f in the lid 72. After the motor terminals Mm are inserted into the penetration holes 72g, the lid 72 is fixedly attached to the cover 65 by means of the screws 73. At this time, the silicon adhesive 76 is forced to flow out from the first concave portion 62a to the second concave portion 62b in accordance with the insertion of the convex portion 72b of the lid 72 into the first concave portion 62a, whereby the silicon adhesive 76 is filled into the gap between the first concave portion 62a and the convex portion 72b.

Furthermore, since the connector housing 72a is formed on the outer periphery of the penetration holes 72f through which the end portions Sm1 of the sensor terminals Sm extend, the sensor terminals Sm are inserted into the penetration holes 72f to form the sensor connector 74.

Moreover, by attaching the lid 72 to the cover 65, there are formed gaps or clearances around the penetration holes 72g and between the outer periphery of the lid 72 and the hole 65a, but an adhesive resin in the form of the silicon adhesive 75 is filled into these gaps or clearances.

At this time, the vent holes 72c are formed in the convex portion 72e which protrudes outward from the surface of the silicon adhesive 75 bonding the cover 65 and the lid 72 with each other, so that the silicon adhesive 75 is prevented from flowing into the vent holes 72c to close or block them.

Then, the electric motor 30 and the control unit 60 thus separately built are assembled with each other. As shown in FIG. 3, the rubber ring 82 is fitted on the bracket 39 of the electric motor 30, and the control unit 60 is fixedly secured to the bracket 39 by means of screws 83, whereupon the connector 74a on the electric motor 30 side and the connector 74 on the control unit 60 of the rotational position sensor 3 are placed in fitting engagement with each other to provide electrical connection therebetween.

Thereafter, the winding terminals 37 of the electric motor 30 and the motor terminals Mm of the control unit 60 are fixedly coupled with each other by screws 84, and electrically connected with each other. At this time, even if there are generated gaps or clearances in the axial direction of the output shaft 32 between the winding terminals 37 and the motor terminals Mm due to reduced assembly accuracy or the like before the connection thereof, the low-rigidity portions Mmb of the motor terminals Mm can be easily deformed, thereby permitting the winding terminals 37 and the motor terminals Mm to be electrically connected with each other.

As described in the foregoing, according to the electric power steering apparatus of the first embodiment of the present invention, since the control unit 60 is fixedly secured to the bracket 39 of the electric motor 30 by means of the screws 83, external wiring and a connector for electrically connecting the electric motor 30 and the control unit 60 with each other become unnecessary, thus making it possible to reduce the cost of manufacture of the apparatus and an electric power loss as well as to suppress radiation noise.

In addition, the control unit 60 is fixedly secured to the bracket 39 of the electric motor 30 by means of the screws 83, and the connector 74a on the electric motor 30 side and the connector 74 on the control unit 60 of the rotational position sensor 3 are fittingly engaged with each other to provide electrical connection therebetween. With this arrangement, external wiring for electrically connecting the electric motor 30 and the control unit 60 with each other becomes unnecessary, and the cost of manufacture of the apparatus is reduced.

Moreover, only small current parts such as the microcomputer 13, its surrounding or peripheral circuit elements, etc., are mounted on the control substrate 63, and hence it is unnecessary to increase the width and/or thickness of each wiring pattern formed on the control substrate 63, thus enabling high density mounting of parts as well as reduction in size of the substrate.

Further, large current parts such as the semiconductor switching elements Q1–Q6, the shunt resistors 8, etc., are mounted on the metal substrate 61, and the metal substrate 61 is mounted on the housing 64 made of aluminum and having cooling fins 64c while being in intimate contact therewith, the housing 64 being arranged at a location apart from and on the opposite side of the heat-generating electric motor 30. With such an arrangement, heat generated by the large current parts and the wiring patterns on the metal substrate 61 can be effectively radiated from the housing 64 to the ambient atmosphere. As a result, even if the size of the metal substrate 61 is decreased, it is possible to suppress a temperature rise of the metal substrate 61, thus preventing deterioration in heat resistance and durability of the wiring patterns formed thereon.

In addition, the inner and outer cooling fins 65b, 65c of the cover 65 made of aluminum are arranged to be shifted or displaced from each other in a direction of the surface of the cover 65, when viewed in a diametrical or radial direction of the electric motor 30, with the pitch or interval of the inner cooling fins 65b being greater than that of the outer cooling fins 65c. With such an arrangement, the heat generated in the control unit 60 is received by the inner cooling fins 65b through natural convection and smoothly radiated to the ambient atmosphere from the outer cooling fins 65c through forced convection by means of a radiator fan and/or running winds. As a result, the temperature in the control unit 60 is suppressed, thus improving the heat resistance and durability of internal parts such as electronic parts on the control substrate 63.

Furthermore, the power connector 68a, the signal connector 68b and the torque sensor connector 68c are formed of an insulating resin and molded into an integral unit, thus making it possible to reduce the size of the housing side connector 68. In addition, the housing side connector 68 and the metal substrate 61 are arranged in the housing 64 so as not to superpose on each other but in parallel to the output shaft 32. Therefore, the height of the apparatus can be lowered to reduce the size thereof.

Moreover, the connector 68 is inserted into the hole 64a in the housing 64 from the outside thereof and fixedly secured to the housing 64 by means of the screws 79, and the silicon adhesive 69 is filled into the hole 64a in the housing 64 thereby to adhere or bond the insulating resin portions of the housing 64 and the connector 68 with each other. With such an arrangement, invasion of water or the like into the housing 64 from the outside thereof is prevented, thus improving the reliability of the apparatus.

In addition, a group of power terminals Pm are arranged adjacent and in parallel to each other in the vicinity of the center of the large current substrate 62, and three paths for the group of motor terminals Mm are also arranged adjacent and in parallel to each other. With such an arrangement, current flows within each group in a reciprocating manner, whereby the generation of electromagnetic noise is suppressed to prevent radio noise from being generated.

Moreover, as shown in FIG. 7, the capacitors 7 are connected with one sides of the motor terminals Mm, respectively, which are connected at the other sides thereof with the motor relays 67, respectively, and the motor relays 67 are connected in series with two outer ones of the three paths, respectively. This arrangement serves to reduce the size of the apparatus.

Further, the motor relays 67 are connected through welding with the path connecting between the bridge circuit 10 and the electric motor 30, and the welding locations 67a of the motor relays 67 are disposed at a side heightwisely opposite to the side at which the motor relays 67 are connected with the motor terminals Mm. Accordingly, an ample working space is secured, thus expediting welding operation and improving workability.

Furthermore, the terminals 68e of the power connector 68a are electrically connected with the conductive plates 110 on the large current substrate 62, and the power terminals Pm and the motor terminals Mm on the large current substrate 62 are electrically connected with the connection terminals Cm, respectively, of the connection member 66 on the metal substrate 61. These connections are carried out not by soldering but by welding, and hence the reliability of the apparatus is improved since welding is highly resistant to temperature changes in comparison with soldering.

In addition, the metal substrate 61 is fixedly secured to the housing 64 while being in intimate contact therewith, and the large current substrate 62 is also fixed so as to cover the metal substrate 61, with the control substrate 63 being arranged so as to superpose on the large current substrate 62. As a result, the metal substrate 61, the large current substrate 62 and the control substrate 63 together form a laminated structure including three layers, thus improving the assemblability of the apparatus.

Moreover, the mating surfaces of the housing 64 and the cover 65 are located between the control substrate 63 and the metal substrate 61, and hence it becomes easy to insert the end portions of the terminals into the through holes 100,101, thus improving workability.

Further, the end portions Cm1 of the connection terminals Cm, the terminals 68b1 of the signal connector 68b, the terminals 68c1 of the torque sensor connector 68c and the end portions Sm1 of the sensor terminals Sm inserted into the through holes 100, 101 in the control substrate 63 are each arranged in the form of a letter L, and at one side of the L-shaped arrangement, the end portions Cm1 of the connection terminals Cm are arranged in parallel to and in the neighborhood of the terminals 68b1, 68c1 of the signal connector 68b and the torque sensor connector 68c. With such an arrangement, it becomes easy to insert the terminals into the through holes 100 in the control substrate 63, thus improving workability.

Furthermore, the end portions Cm1 of the connection terminals Cm, the terminals 68b1 of the signal connector 68b, the terminals 68c1 of the torque sensor connector 68c and the end portions Sm2 of the sensor terminals Sm inserted into the through holes 100, 101 in the control substrate 63 are concentrated on two sides of the control substrate 63, and the mating surfaces of the housing 64 and the cover 65 are located between the control substrate 63 and the metal substrate 61. With such an arrangement, it becomes easy to insert the end portions of the terminals into the through holes 100, 101, thereby improving workability.

Moreover, the silicon adhesive 76 is filled in the first concave portion 62a of the large current substrate 62, and the motor terminals Mm and the end portions Sm1 of the sensor terminals Sm are inserted in the penetration holes 72f, 72g, respectively, of the lid 72. Then, the lid 72 is attached to the cover 65 by means of screws 73, with the convex portion 72b of the lid 72 being inserted into the first concave portion 62a of the large current substrate 62, whereby the silicon adhesive 76 is forced to flow out from the first concave portion 62a to the second concave portion 62b to be filled into the gap between the first concave portion 62a and the convex portion 72b. As a result, the airtightness of the mating portions of the sensor terminals Sm and the lid 72 is secured, thereby preventing the invasion of water or the like into the apparatus from the outside thereof to improve the reliability of the apparatus.

In addition, the connector housing 72a is formed on the outer periphery of the penetration holes 72f in the lid 72 for the sensor terminals Sm, and the sensor terminals Sm are inserted into the penetration holes 72f to constitute the sensor connector 74. Accordingly, it is not necessary to form the sensor connector 74 and the lid 72 separately from each other, thus reducing the cost of manufacture of the apparatus.

By attaching the lid 72 to the cover 65, there are formed a gap or clearance between the outer periphery of the lid 72 and the hole 65a and gaps or clearances around the penetration holes 72g, but an adhesive resin in the form of the silicon adhesive 75 is filled into these gaps, so that the airtightness of the mating portions of the lid 72 and the cover 65 is secured, thus preventing the invasion of water or the like into the apparatus from the outside thereof to improve the reliability of the apparatus.

Moreover, the vent holes 72c are formed in the convex portion 72e lying higher than the surface of the silicon adhesive 75 which bonds the cover 65 and the lid 72 with each other, so that the silicon adhesive 75 is prevented from flowing into the vent holes 72c to close them.

In addition, the silicon adhesive 76 flowing out from the first concave portion 62a is caught by the second concave portion 62b, and hence the silicon adhesive 76 is prevented from scattering over the internal parts such as the motor relays 67, etc., thus improving the reliability of the apparatus.

Further, the lid 72 is provided with the vent holes 72c, and the water-repellent filter 77 is heat welded to the inner side of the lid 72 so as to cover the vent holes 72c. With this arrangement, it is possible to prevent water from invading from a steering gear (not shown) through the gear case 51, the electric motor 30, etc., into the control unit 60 incorporating therein a lot of electronic parts, as a consequence of which the reliability of the apparatus is improved.

Furthermore, the vent holes 72c are formed inside the wall 72d higher than the surface of the silicon adhesive 75 which bonds the cover 65 and the lid 72 with each other, so that the silicon adhesive 75 is prevented from flowing into the vent holes 72c to close them, thus improving the reliability of the apparatus.

Moreover, owing to the arrangement of the vent holes 72c which are formed inside the wall 72d higher than the surface of the silicon adhesive 75 bonding the cover 65 and the lid 72 with each other, it is possible to decrease the amount of use of the silicon adhesive 75, thus reducing the manufacturing cost of the apparatus.

In addition, each of the motor terminals Mm has a low-rigidity portion Mmb formed in a portion protruded from the lid 72 and extending up to a location where it is electrically connected with the electric motor 30. With this arrangement, even if there are generated gaps or clearances between the motor terminals Mm and the winding terminals 37 of the electric motor 30, the low-rigidity portions Mmb of the motor terminals Mm can be easily deformed, thus preventing an excessive stress from being generated in the winding terminals 37 of the electric motor 30. As a result, the reliability of the apparatus is improved.

Embodiment 2.

Figure 11:
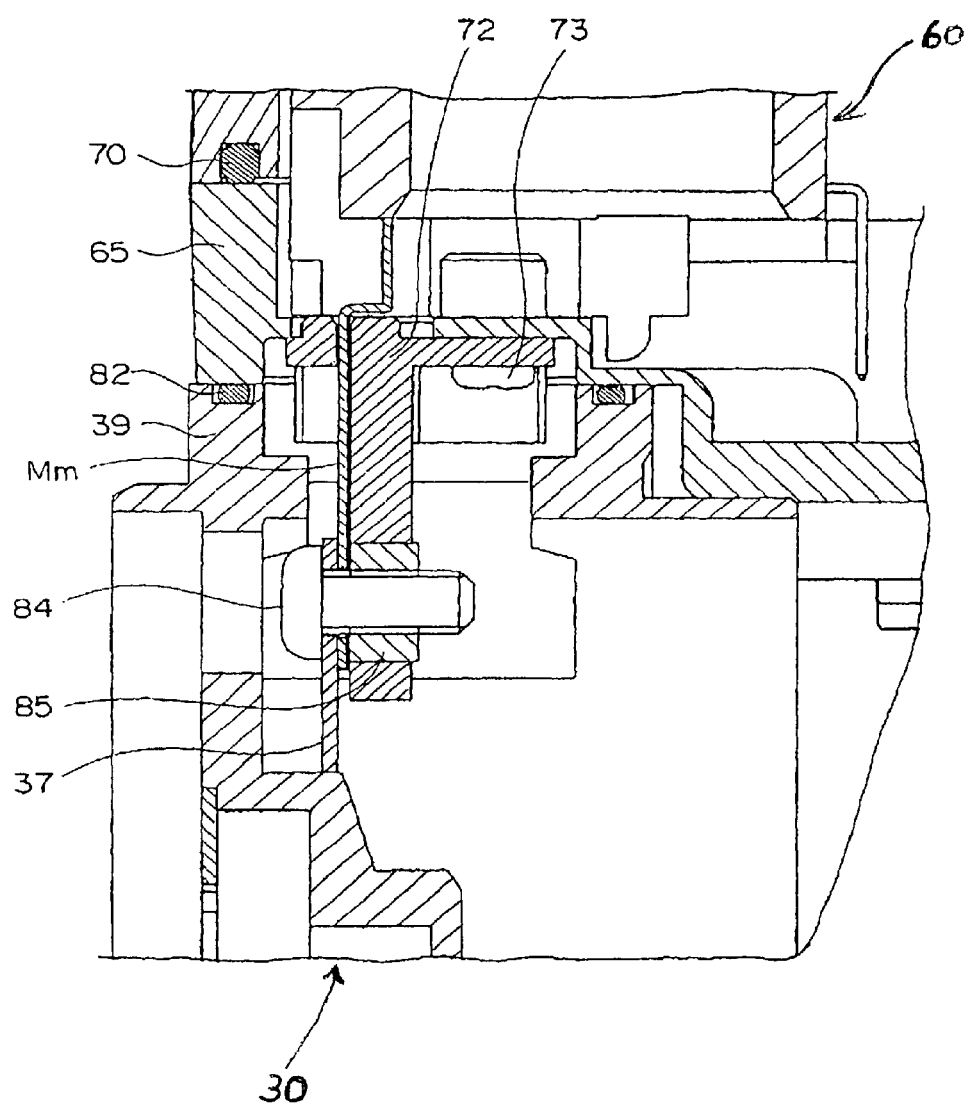
FIG. 11 is a cross sectional view showing a part of an electric power steering apparatus according to a second embodiment of the present invention.

FIG. 11 is a cross sectional view which shows a part of an electric power steering apparatus according to a second embodiment of the present invention.

In this embodiment, a nut 85 is insert molded to that portion which is electrically connected with the electric motor 30, thereby forming the lid 72.

The construction of this embodiment other than the above is similar to the construction of the electric power steering apparatus according to the above-mentioned first embodiment.

In the second embodiment, when the electric motor 30 and the control unit 60 separately assembled are combined into an integral unit, the winding terminals 37 of the electric motor 30, the motor terminals Mm of the control unit 60 and the nut 85 are arranged in this order from the left side in the axial direction of the electric motor 30 in FIG. 11, and they are fixedly coupled with each other by means of the screws 84 to provide mutual electrical connection therebetween.

In addition, in cases where the control unit 60 is arranged at a location apart from the electric motor 30, terminals attached to external wiring may be fixedly secured to the nut 85 of the cap 72 of the control unit 60 by means of screws by using external wiring without changing the structure of the control unit 60, whereby the terminals of the external wiring and the motor terminals Mm are electrically connected with each other.

According to the electric power steering apparatus of the second embodiment, the nut 85 is insert molded to that portion of the lid 72 which is electrically connected with the electric motor 30. Thus, in cases where the control unit 60 is arranged at a location apart from the electric motor 30, the control unit 60 and the electric motor 30 mutually remote from each other can be electrically connected with each other by fixedly mounting terminals attached to external wiring onto the nut 85 of the cap 72 of the control unit 60 through screws by using the external wiring without changing the structure of the control unit 60.

Although in the above-mentioned first and second embodiments, the number of the poles of the permanent magnet 31 has been assumed to be eight and the number of the salient poles of the stator 36 are assumed to be twelve, the numbers of these poles are not limited to this combination, but may be any other combination as required.

In addition, the electric power steering apparatus is installed in the engine room of the vehicle, and in order to secure waterproof, the rubber rings 43, 70, 82 and the silicon adhesives are employed, with the water-repellent filter 77 being welded to the inner side of the lid 72 so as to cover the vent holes 72c. However, the electric power steering apparatus may be installed in the passenger's compartment of the vehicle. In this case, the rubber rings 43, 70, 82, the silicon adhesives and the water-repellent filter 77 may be omitted.

Moreover, an HITT substrate is used as the metal substrate 61, but the metal substrate 61 is not limited to the HITT substrate. Thus, the metal substrate 61 may comprise a metal base of excellent thermal conductivity such as aluminum with wiring patterns formed thereon via an insulating layer. Alternatively, it may comprise a substrate of any other metal of excellent thermal conductivity such as copper, or it may comprise a ceramic substrate.

Further, the resolver is used as the rotational position sensor 3, which is, however, not limited to this. The rotational position sensor 3 may comprise another magnetic detection element such as a magneto-resistive element (MR), a giant magneto-resistive (GMR) element, a Hall element, a Hall IC and so on.

Furthermore, the electric motor 30 is not limited to the brushless motor but may be an induction motor, a switched reluctance (SR) motor, a DC brushed motor, etc.

In addition, three motor relays 67 may be mounted as switches.

Moreover, although screws are used to fix the respective parts, other fastening means such as rivets, etc., may be used.

As described in the foregoing, according to the present invention, there is provided an electric power steering apparatus equipped with an electric motor adapted to output assist torque to a steering wheel of a vehicle, and a control unit for controlling the driving of the electric motor. The control unit includes: a power substrate mounting thereon a bridge circuit which includes a plurality of semiconductor switching elements for switching current supplied to the electric motor in accordance with a torque assisting the steering wheel; capacitors for absorbing ripples contained in the current; a control substrate mounting thereon a microcomputer which generates a drive signal for controlling the bridge circuit based on at least steering torque of the steering wheel; a power connector electrically connected to a battery of the vehicle; a signal connector adapted to input and output signals through external wiring; a plurality of motor terminals electrically connected with the electric motor; a large current substrate mounting thereon at least the capacitors and having conductive plates forming wiring patterns and the motor terminals insert molded thereto with an insulating resin; and a housing and a cover in which the power substrate, the control substrate and large current substrate are received. The power substrate, the power connector and the signal connector are arranged in the housing in parallel with each other in an axial direction of the electric motor, with the motor terminals being protruded outward from the cover. With the above arrangement, it is possible to reduce the height or the size in the vertical direction of the apparatus, without causing no interference between the power substrate, the power connector and the signal connector. In addition, the housing is arranged on the opposite side of the heat-generating electric motor, so that the heat inside the control unit is effectively radiated, thus improving the durability and heat resistance of the apparatus.

Preferably, the cover is fixedly secured to the housing in parallel to the axial direction of the electric motor, and the motor terminals are inserted into the electric motor and electrically connected with the electric motor. Accordingly, the electric motor and the control unit are assembled in separate processes and combined with each other to form an integral unit in a final process, thus improving workability. In addition, external wiring and a connector for electrically connecting the electric motor and the control unit with each other become unnecessary, thus making it possible to reduce the cost of manufacture of the apparatus and an electric power loss as well as to suppress radiation noise.

Preferably, the cover and the housing are made of a metallic material of high thermal conductivity. Accordingly, the heat inside the control unit is effectively radiated, thus improving the durability and the heat resistance of the apparatus.

Preferably, the cover and the housing are made of aluminum, and hence they can be produced at low cost and reduced in weight.

Preferably, cooling fins are formed on the surfaces of the cover and the housing. Thus, a large heat radiation area is provided so that the heat inside the control unit is effectively radiated, thus improving the durability and the heat resistance of the apparatus.

Preferably, the cover is formed on its inner and outer surfaces with inner and outer cooling fins, respectively, so that the heat generated in the control unit is received by the inner cooling fins through natural convection and smoothly radiated to the ambient atmosphere from the outer cooling fins by a radiator fan and/or running winds through forced convection. As a result, the temperature in the control unit is suppressed, thus improving the heat resistance and durability of internal parts such as electronic parts on the control substrate.

Preferably, the inner and outer cooling fins of the cover are arranged to be shifted or displaced from each other in a direction of the plane or surface of the cover when viewed in a diametrical or radial direction of the electric motor, so that they do not superpose on each other in the above direction. Accordingly, the resistance of a heat path between the inner cooling fins and the outer cooling fins is limited so that the heat received by the inner cooling fins can be efficiently radiated to the ambient atmosphere from the outer cooling fins.

Preferably, the pitch or interval of the inner cooling fins is greater than that of the outer cooling fins. The inner cooling fins function to perform heat transfer by natural convection, whereas the outer cooling fins function to perform heat transfer in a state including forced convection in addition to natural convection. However, natural convection is smoothly performed with the inner cooling fins so that the heat received by the inner cooling fins is radiated from the outer cooling fins to the ambient atmosphere more efficiently.

Preferably, the power connector and the signal connector are comprised of a single connector which is integrally molded from an insulating resin. This serves to reduce the entire connector size.

Preferably, the connector comprises a housing side connector which is fixedly secured to an outer side of the housing having holes into which terminals of the power connector and terminals of the signal connector are inserted from outside. Thus, the housing side connector can be easily fixed to the housing.

Preferably, an adhesive resin is filled into gaps between the holes and the housing side connector generated upon mounting of the housing side connector onto the housing. Accordingly, invasion of water or the like into the housing from the outside thereof is prevented, thus improving the waterproofness of the apparatus.

Preferably, the conductive plates connected with the power connector are arranged in parallel with each other substantially in the center of the large current substrate, and the capacitors are arranged on the opposite side of the motor terminals with the conductive plates interposed therebetween. With such an arrangement, current flows in a power system group in a reciprocating manner, and the capacitors absorb current ripples effectively. Accordingly, the generation of electromagnetic noise is suppressed to prevent radio noise from being generated.

Preferably, the conductive plates are connected with the terminals of the power connector by means of welding, and hence the mechanical strength and the resistance to temperature changes of the connected portions are increased, thus improving the reliability of the apparatus.

Preferably, a switch for switching on and off a current supplied to the electric motor through the motor terminals is arranged in at least one of the paths which connect between the bridge circuit and the electric motor. Thus, the supply of current to the electric motor is turned on and off in a reliable manner by means of the switch.

Preferably, switches each for switching on and off a current supplied to the three-phase brushless motor through the motor terminals are arranged in at least two ones of three parallel paths connecting between the three-phase brushless motor and the bridge circuit. Thus, the currents supplied to the three-phase brushless motor are turned on and off in a reliable manner by means of the switches, respectively.

Preferably, the switches are arranged in those two ones of the three parallel paths which are arranged on opposite outer sides. Accordingly, another conductive plate can be arranged between these two switches, thus making it possible to reduce the size of the apparatus.

Preferably, the switches are connected with the paths by welding, with their welding locations being arranged at a side opposite in a diametral direction of the electric motor to that side at which the switches are connected with the motor terminals. Thus, the welding operation can be facilitated in an ample space located apart from the electric motor, thereby improving workability.

Preferably, the power substrate is fixedly secured to the housing while being covered with the large current substrate, and the power substrate is of a laminated structure of three layers in which the large current substrate and the control substrate are superposed on the power substrate in this order in a direction toward the cover, the cover being fixed to the housing to form an internally sealed structure, and the housing and the cover have their mating surfaces located at a power substrate side of the control substrate. With such an arrangement, assembling becomes easy, and it also becomes easy to insert the terminals in the through holes in the control substrate, thus improving workability of the apparatus.

Preferably, in the power substrate, the end portions of the plurality of connection terminals connected with the control substrate are arranged in the form of a letter L, when viewed in a direction perpendicular to the power substrate. The end portions of the connection terminals located at one side of the L-shaped configuration are arranged in the neighborhood of and in parallel with terminals of the signal connector. With such an arrangement, it becomes easy to insert the terminals in the through holes in the control substrate, thus improving workability of the apparatus.

Preferably, the cover is formed with an opening through which the motor terminals are exposed outwardly from the cover, with a lid of an insulating resin being attached to an outer side of said cover, the lid having a penetration hole through which the motor terminals are able to penetrate. Thus, dust, dirt and the like are prevented from invading into the control unit.

Preferably, an adhesive resin is filled into a gap between the outer periphery of the cover and the opening and surroundings of those portions of the motor terminals which are protruded from the cover. Thus, the adhesive resin is filled into the mating portions of the cover, the motor terminals and the lid so as to secure airtightness. Accordingly, invasion of water or the like into the control unit from the outside thereof is prevented, thus improving the water resistance of the apparatus.

Preferably, the electric motor comprises a three-phase brushless motor, and the lid is formed with a connector housing of a sensor connector which is connected with a rotational position sensor for detecting a rotational position of a rotor of the brushless motor. Accordingly, the sensor connector and the lid need not be separately formed, thereby reducing the manufacturing cost and the size of the apparatus.

Preferably, a plurality of sensor terminals connecting between the microcomputer and the rotational position sensor are insert molded to the large current substrate, and the connector housing is formed with a plurality of penetration holes through which one end portions of the sensor terminals extend, the one end portions of the sensor terminals being inserted into the penetration holes thereby to construct the sensor connector. As a result, the sensor connector and the lid need not be separately formed, thus reducing the manufacturing cost of the apparatus.

Preferably, the other end portions of the sensor terminals are arranged in alignment with the end portions, at the other side of the L-shaped configuration, of the connection terminals. Thus, it becomes easy to insert the sensor terminals into the through holes in the control substrate, thereby improving the workability of the apparatus.

Preferably, the large current substrate has a first concave portion formed at a location adjacent the one end portions of the sensor terminals. The lid has a convex portion which is formed at a location including the penetration holes for the sensor terminals, and into which the first concave portion is inserted with a gap formed therebetween, an adhesive resin being filled into said gap. Accordingly, in the large current substrate, the adhesive resin is filled into the mating portions of the sensor terminals and the lid, whereby it is possible to secure airtightness and to prevent the invasion of water or the like into the control unit from the sensor connector thereof. As a result, the reliability of the apparatus is improved.

Preferably, the large current substrate has a second concave portion which is formed in the neighborhood of the first concave portion, and into which the adhesive resin is able to flow. Thus, the silicon adhesive flowing out from the first concave portion is caught by the second concave portion, so that the silicon adhesive is prevented from scattering over the parts such as switches and so on inside the control unit, thus improving the reliability of the apparatus.

Preferably, the lid has vent holes formed therethrough for fluid communication with an ambient atmosphere. Thus, a pressure difference between the inside and the outside of the control unit can be reduced by the breathing action of the vent holes.

Preferably, the vent holes are equipped with a filter which permits the passage of air but blocks the passage of water. Thus, the filter serves to prevent invasion of water or the like into the control unit which incorporates therein a lot of electronic parts. Consequently, the reliability of the apparatus is improved.

Preferably, the vent holes are formed at locations protruded from a surface of an adhesive resin bonding the cover and the lid with each other. Thus, the silicon adhesive is prevented from flowing into the vent holes to close them, thereby improving the reliability of the apparatus.

Preferably, the lid is formed with a wall which protrudes from a surface of an adhesive resin bonding the cover and the lid with each other, and the vent holes are formed inside said wall. Accordingly, the silicon adhesive is prevented from flowing into the vent holes to close them, thus improving the reliability of the apparatus. In addition, the amount of use of the silicon adhesive is decreased, thus reducing the manufacturing cost of the apparatus.

Preferably, each of the motor terminals has a narrow low-rigidity portion formed at its intermediate portion. Thus, even if there are generated gaps or clearances between the motor terminals and the winding terminals of the electric motor, the low-rigidity portions of the motor terminals can be easily deformed, thereby preventing an excessive stress from being generated in the winding terminals of the electric motor. As a consequence, the reliability of the apparatus is improved.

Preferably, a nut is insert molded to the lid at a location at which the lid is electrically connected with the electric motor. Accordingly, when the control unit is arranged at a location apart from the electric motor, the control unit and the electric motor can be electrically connected with each other by using the external wiring without changing the structure of the control unit. As a result, the apparatus can be standardized.

While the invention has been described in terms of preferred embodiments, those skilled in the art will recognize that the invention can be practiced with modifications within the spirit and scope of the appended claims.

What is claimed is:

1. An electric power steering apparatus equipped with an electric motor adapted to output assist torque to a steering wheel of a vehicle, and a control unit for controlling the driving of said electric motor, said control unit comprising:

a power substrate mounting thereon a bridge circuit which includes a plurality of semiconductor switching elements for switching current supplied to said electric motor in accordance with a torque assisting said steering wheel;

capacitors for absorbing ripples contained in said current;

a control substrate mounting thereon a microcomputer which generates a drive signal for controlling said bridge circuit based on at least steering torque of said steering wheel;

a power connector electrically connected to a battery of the vehicle;

a signal connector adapted to input and output signals through external wiring;

a plurality of motor terminals electrically connected with said electric motor;

a large current substrate mounting thereon at least said capacitors and having conductive plates forming wiring patterns and said motor terminals insert molded thereto with an insulating resin; and a housing and a cover in which said power substrate, said control substrate and large current substrate are received;

wherein said power substrate, said power connector and said signal connector are arranged in said housing in parallel with each other in an axial direction of said electric motor, with said motor terminals being protruded outward from said cover, wherein said cover is fixedly secured to said housing in parallel to the axial direction of said electric motor, and said motor terminals are inserted into said electric motor and electrically connected with said electric motor.

2. The electric power steering apparatus according to claim 1, wherein said conductive plates connected with said power connector are arranged in parallel with each other substantially in the center of said large current substrate, and said capacitors are arranged at the opposite side of said motor terminals with said conductive plates interposed therebetween.

3. The electric power steering apparatus according to claim 1, wherein said electric motor comprises a three-phase brushless motor, and switches each for switching on and off a current supplied to said three-phase brushless motor through said motor terminals are arranged in at least two ones of three parallel paths connecting between said three-phase brushless motor and said bridge circuit.

4. The electric power steering apparatus according to claim 3, wherein said switches are arranged in those two ones of the three parallel paths which are arranged on opposite outer sides.

5. The electric power steering apparatus according to claim 3, wherein said switches are connected with said paths by welding, with their welding locations being arranged at a side opposite in a diametral direction of said electric motor to that side at which said switches are connected with said motor terminals.

6. The electric power steering apparatus according to claim 1, wherein said power substrate is fixedly secured to said housing while being covered with said large current substrate, and said power substrate is of a laminated structure of three layers in which said large current substrate and said control substrate are superposed on said power substrate in this order in a direction toward said cover, said cover being fixed to said housing to form an internally sealed structure, and said housing and said cover have their mating surfaces located at a power substrate side of the control substrate.

7. The electric power steering apparatus according to claim 1, wherein each of said motor terminals has a narrow low-rigidity portion formed at its intermediate portion.

8. An electric power steering apparatus equipped with an electric motor adapted to output assist torque to a steering wheel of a vehicle, and a control unit for controlling the driving of said electric motor, said control unit comprising:

a power substrate mounting thereon a bridge circuit which includes a plurality of semiconductor switching elements for switching current supplied to said electric motor in accordance with a torque assisting said steering wheel;

capacitors for absorbing ripples contained in said current;

a control substrate mounting thereon a microcomputer which generates a drive signal for controlling said bridge circuit based on at least steering torque of said steering wheel;

a power connector electrically connected to a battery of the vehicle;

a signal connector adapted to input and output signals through external wiring;

a plurality of motor terminals electrically connected with said electric motor;

a large current substrate mounting thereon at least said capacitors and having conductive plates forming wiring patterns and said motor terminals insert molded thereto with an insulating resin; and a housing and a cover in which said power substrate, said control substrate and large current substrate are received;

wherein said power substrate, said power connector and said signal connector are arranged in said housing hi parallel with each other in an axial direction of said electric motor, with said motor terminals being protruded outward from said cover, wherein said cover is formed with an opening through which said motor terminals are exposed outwardly from said cover, with a lid of an insulating resin being attached to an outer side of said cover, said lid having a plurality of penetration holes through which said motor terminals are able to extend.

9. The electric power steering apparatus according to claim 8, wherein an adhesive resin is filled into a gap between the outer periphery of said cover and said opening and surroundings of those portions of said motor terminals which are protruded from said cover.

10. The electric power steering apparatus according to claim 8, wherein said electric motor comprises a three-phase brushless motor, and said lid is formed with a connector housing of a sensor connector which is connected with a rotational position sensor for detecting a rotational position of a rotor of said brushless motor.

11. The electric power steering apparatus according to claim 10, wherein a plurality of sensor terminals connecting between said microcomputer and said rotational position sensor are insert molded to said large current substrate, and said connector housing is formed with a plurality of penetration holes through which one end portions of said sensor terminals extend, the one end portions of said sensor terminals being inserted into said penetration holes thereby to construct said sensor connector.

12. The electric power steering apparatus according to claim 11, wherein said large current substrate has a first concave portion formed at a location adjacent the one end portions of said sensor terminals, and said lid has a convex portion which is formed at a location including said penetration holes for said sensor terminals, and into which said first concave portion is inserted with a gap formed therebetween, an adhesive resin being filled into said gap.

13. The electric power steering apparatus according to claim 12, wherein said large current substrate has a second concave portion which is formed in the neighborhood of said first concave portion, and into which said adhesive resin is able to flow.

14. The electric power steering apparatus according to claim 8, wherein said lid has vent holes formed therethrough for fluid communication with an ambient atmosphere.

15. The electric power steering apparatus according to claim 14, wherein said vent holes are equipped with a filter which permits the passage of air but blocks the passage of water.

16. The electric power steering apparatus according to claim 15, wherein said vent holes are formed at locations protruded from a surface of an adhesive resin bonding said cover and said lid with each other.

17. The electric power steering apparatus according to claim 14, wherein said lid is formed with a wall which protrudes from a surface of an adhesive resin bonding said cover and said lid with each other, and said vent holes are formed inside said wall.

18. The electric power steering apparatus according to claim 8, wherein a nut is insert molded to said lid at a location at which said lid is electrically connected with said electric motor.

* * * * *